(12) United States Patent
Gopalan

(10) Patent No.: US 7,651,036 B2
(45) Date of Patent: Jan. 26, 2010

(54) THREE JET ISLAND FLUIDIC OSCILLATOR

(75) Inventor: Shridhar Gopalan, Westminster, MD (US)

(73) Assignee: Bowles Fluidics Corporation, Columbia, MD (US)

( * ) Notice: Subject to any disclaimer, the term of this patent is extended or adjusted under 35 U.S.C. 154(b) by 394 days.

(21) Appl. No.: 10/968,749

(22) Filed: Oct. 19, 2004

(65) Prior Publication Data

US 2005/0087633 A1    Apr. 28, 2005

Related U.S. Application Data

(60) Provisional application No. 60/515,068, filed on Oct. 28, 2003.

(51) Int. Cl.
*B05B 17/04* (2006.01)
(52) U.S. Cl. ............ 239/11; 239/589.1; 239/589; 239/DIG. 3; 137/811; 137/826
(58) Field of Classification Search ............ 239/589.1, 239/284.1, 284.2, 589, 590, 11, 101, DIG. 3; 137/826, 811, 836
See application file for complete search history.

(56) References Cited

U.S. PATENT DOCUMENTS

| | | | |
|---|---|---|---|
| 3,185,166 A | 5/1965 | Horton | |
| 3,563,462 A | 2/1971 | Bauer | |
| 4,052,002 A | 10/1977 | Stouffer | |
| 4,151,955 A | 5/1979 | Stouffer | |
| 4,157,161 A | 6/1979 | Bauer | |
| 4,231,519 A * | 11/1980 | Bauer | 239/589.1 |
| 4,398,664 A | 8/1983 | Stouffer | |
| 4,463,904 A | 8/1984 | Bray | |
| 4,508,267 A | 4/1985 | Stouffer | |
| 4,562,867 A | 1/1986 | Stouffer | |
| 4,596,364 A * | 6/1986 | Bauer | 239/589.1 |
| 5,035,361 A | 7/1991 | Stouffer | |
| 5,181,660 A | 1/1993 | Stouffer et al. | |
| 5,213,269 A | 5/1993 | Srinath et al. | |

(Continued)

*Primary Examiner*—Dinh Q Nguyen
(74) *Attorney, Agent, or Firm*—Larry J. Guffey

(57) ABSTRACT

A fluidic oscillator suitable for use at colder temperatures for utilizing a pressurized liquid to generate a uniform spatial distribution of droplets has (a) an inlet for the pressurized liquid, (b) a set of three power nozzles that are fed by the pressurized liquid, (c) an interaction chamber attached to the nozzles and which receives the flow from the nozzles, wherein this chamber has an upstream and a downstream portion, with the upstream portion having a pair of boundary edges and a longitudinal centerline that is approximately equally spaced between the edges, and wherein one of the power nozzles is directed along the chamber's longitudinal centerline, (d) a throat from which the liquid exhausts from the interaction chamber, and (e) an island located in the interaction chamber, with this island being situated downstream of the power nozzle that is directed along the chamber's longitudinal centerline. In a preferred embodiment, this oscillator is further configured such that: (i) one of the power nozzles is located proximate each of the chamber's boundary edges, (ii) its nozzles are configured to accelerate the movement of the liquid that flows through the nozzles, (iii) its throat has right and left sidewalls that diverge downstream, and (iv) the power nozzles and island are oriented and scaled such as to generate flow vortices behind the island that are swept out of the throat in a manner such that these vortices flow alternately proximate the throat's right sidewall and then its left sidewall.

45 Claims, 12 Drawing Sheets

U.S. PATENT DOCUMENTS

| | | | |
|---|---|---|---|
| 5,259,815 A * | 11/1993 | Stouffer et al. | 454/125 |
| 5,524,660 A * | 6/1996 | Dugan | 137/14 |
| 5,749,525 A | 5/1998 | Stouffer | |
| 5,820,034 A | 10/1998 | Hess | |
| 5,845,845 A | 12/1998 | Merke et al. | |
| 5,906,317 A | 5/1999 | Srinath | |
| 5,971,301 A | 10/1999 | Stouffer et al. | |
| 6,186,409 B1 | 2/2001 | Srinath et al. | |
| 6,240,945 B1 | 6/2001 | Srinath et al. | |
| 6,253,782 B1 | 7/2001 | Raghu | |
| 6,457,658 B2 * | 10/2002 | Srinath et al. | 239/589.1 |
| 6,805,164 B2 | 10/2004 | Stouffer | |
| 7,267,290 B2 * | 9/2007 | Gopalan et al. | 239/589.1 |

\* cited by examiner

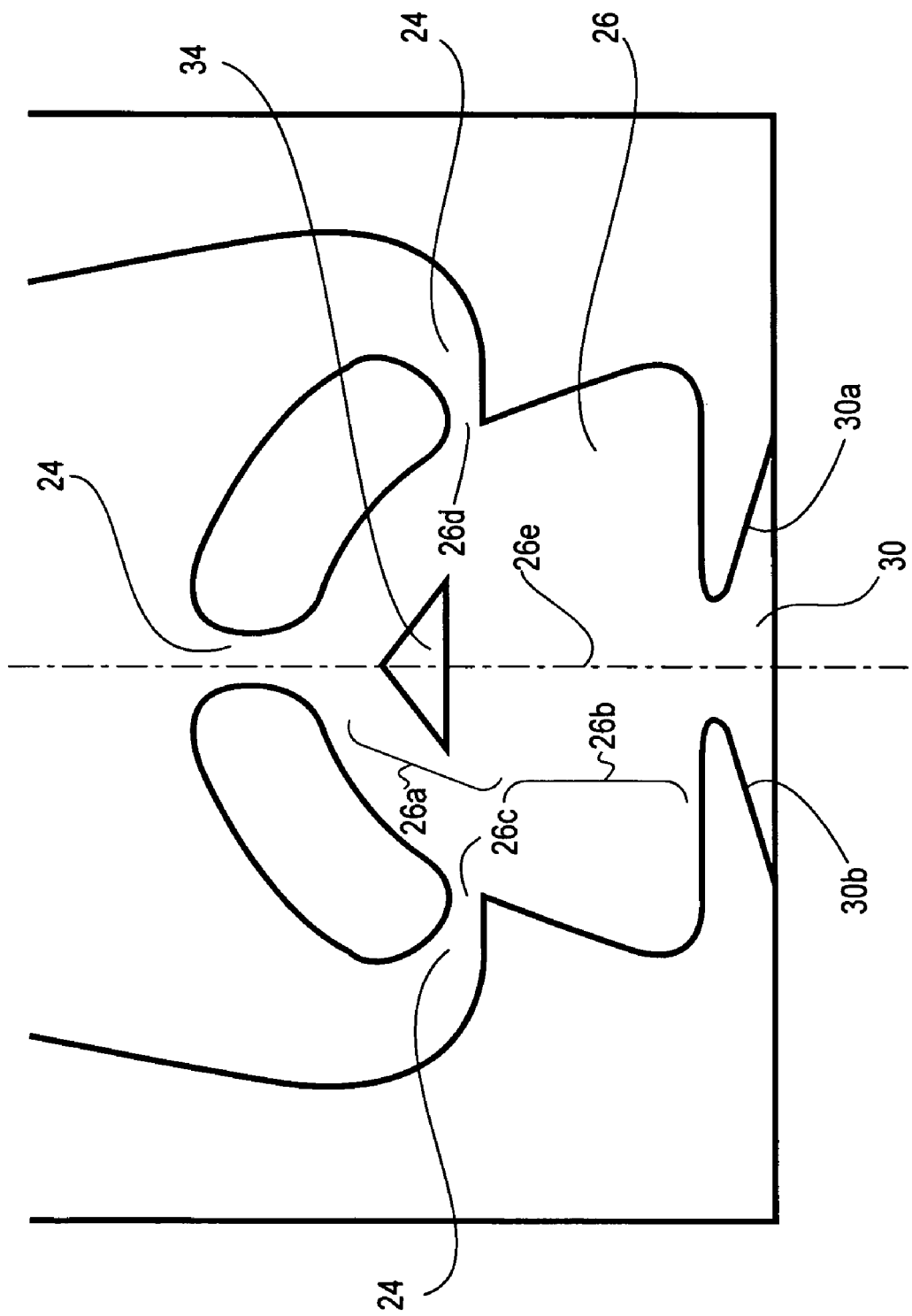

B-B

THREE JET ISLAND FLUIDIC OSCILLATOR

CROSS-REFERENCE TO RELATED APPLICATION

This application claims the benefit of U.S. Provisional Patent Application No. 60/515,068, filed Oct. 28, 2003 by Shridhar Gopalan.

BACKGROUND OF THE INVENTION

1. Field of the Invention

This invention relates to fluid handling processes and apparatus. More particularly, this invention relates to a fluidic oscillator that can control the spraying of high viscosity fluids so that such sprays are uniformly distributed over their target areas.

2. Description of the Related Art

Fluidic oscillators are well known in the prior art for their ability to provide a wide range of liquid spray patterns by cyclically deflecting a liquid jet. The operation of most fluidic oscillators is characterized by the cyclic deflection of a fluid jet without the use of mechanical moving parts. Consequently, an advantage of fluidic oscillators is that they are not subject to the wear and tear which adversely affects the reliability and operation of other spray devices.

Examples of fluidic oscillators may be found in many patents, including U.S. Pat. Nos. 3,185,166 (Horton & Bowles), 3,563,462 (Bauer), 4,052,002 (Stouffer & Bray), 4,151,955 (Stouffer), 4,157,161 (Bauer), 4,231,519 (Stouffer), which was reissued as RE 33,158, U.S. Pat. Nos. 4,508,267 (Stouffer), 5,035,361 (Stouffer), 5,213,269 (Srinath), 5,971,301 (Stouffer), 6,186,409 (Srinath) and 6,253,782 (Raghu).

The nature of the typical oscillations in the flow of a liquid exhausting from such devices into a gaseous environment is shown in FIGS. 1A-1C. The alternating formation of vortices in the top and bottom regions of downstream end of the oscillator's interaction chamber is seen to cause the flow from its outlet to be alternately swept upward or downward such the oscillator's output is spread over a fan angle of approximately 2θ.

This type of oscillating liquid jet can yield a variety of patterns for the downstream distribution of the liquid droplets that are formed as this liquid jet breaks apart in the surrounding gaseous environment. One such possible distribution pattern is shown in FIG. 1C.

For the spraying of high viscosity liquids, the "mushroom oscillator" disclosed in U.S. Pat. No. 6,253,782 and shown in FIG. 2 has been found to be especially useful. However, the flow from such a fluidic oscillator is characterized by having the swept jet, that issues from it, dwell on the end positions of its sweep such that its downstream distribution of droplets, which impact upon a plane that is perpendicular to the direction of the spray, is heavy ended as characterized by a larger volume of the liquid being collected at the two ends of the distribution. See FIG. 3. Considerable difficulties have been encountered in trying to get this type of fluidic oscillator to operate so as to yield more spatially uniform droplet distributions.

Despite much prior art relating to fluidic oscillators, there still exists a need for further technological improvements in this area. For example, there still exist situations in which the known fluidic oscillators are incapable of providing the desired spray patterns under all ranges of operating conditions (e.g., uniform spatial distribution of droplets from high viscosity sprays). Such situations are known to arise in various automotive applications under conditions of extremely cold temperatures.

3. Objects And Advantages

There has been summarized above, rather broadly, the prior art that is related to the present invention in order that the context of the present invention may be better understood and appreciated. In this regard, it is instructive to also consider the objects and advantages of the present invention.

It is an object of the present invention to provide new, improved fluidic oscillators and fluid flow methods that are capable of generating oscillating, fluid jets with spatially uniform droplet distributions over a wide range of operating temperatures.

It is another object of the present invention to provide improved fluidic oscillators and fluid flow methods that are capable of generating oscillating, fluid jets with high viscosity liquids.

It is yet another object of the present invention to provide improved fluidic oscillators and fluid flow methods that yield fluid jets and sprays of droplets having properties that make them more efficient for surface cleaning applications.

These and other objects and advantages of the present invention will become readily apparent as the invention is better understood by reference to the accompanying summary, drawings and the detailed description that follows.

SUMMARY OF THE INVENTION

Recognizing the need for the development of improved fluidic oscillators that are capable of operating to spray high viscosity fluids whose droplets are more uniformly distributed over their target areas, the present invention is generally directed to satisfying the needs set forth above and overcoming the disadvantages identified with prior art devices and methods.

In accordance with the present invention, the foregoing need can be satisfied by providing a fluidic oscillator that is comprised of the following elements: (a) an inlet for the pressurized fluid, (b) a set of three power nozzles that are fed by the pressurized fluid that flow from the inlet, (c) an interaction chamber attached to the nozzles and which receives the flow from the nozzles, wherein this chamber has an upstream and a downstream portion, with the upstream portion having a pair of boundary edges and a longitudinal centerline that is approximately equally spaced between the edges, and wherein one of the power nozzles is located proximate the chamber's longitudinal centerline, (d) a throat from which the spray exhausts from the interaction chamber, and (e) an island located in the interaction chamber, with this island being situated downstream of the power nozzle that is located proximate the chamber's longitudinal centerline.

In a first preferred embodiment, this oscillator is configured such that: (a) one of the power nozzles is located proximate each of the chamber's boundary edges, (b) its nozzles are configured to accelerate the movement of the pressurized fluid that flows through the nozzles, (c) its throat has right and left sidewalls that diverge downstream, and (d) the power nozzles and island are oriented and scaled such as to generate flow vortices behind the island that are swept out of the throat in a manner such that these vortices flow alternately proximate the throat's right sidewall and then its left sidewall.

In a second preferred embodiment, this oscillator's interaction chamber has a floor that is sloped downward in the direction from the upstream to the downstream portion of the chamber, with a preferred magnitude for this slope to be in the range of 10 to 20 degrees.

In a third preferred embodiment, this oscillator has a step in the height elevation of the floor of the power nozzles with respect to that of the chamber's floor, with a preferred range for the ratio of the height of this step to the height of the power nozzle being 0.10 to 0.20.

Thus, there has been summarized above, rather broadly, the present invention in order that the detailed description that follows may be better understood and appreciated. There are, of course, additional features of the invention that will be described hereinafter and which will form the subject matter of the claims to this invention.

BRIEF DESCRIPTION OF THE DRAWINGS

FIG. 5B illustrates more details of the geometry of the interaction chamber, power nozzles and throat shown in FIG. 5A

DESCRIPTION OF THE PREFERRED EMBODIMENT

Figure 1A:
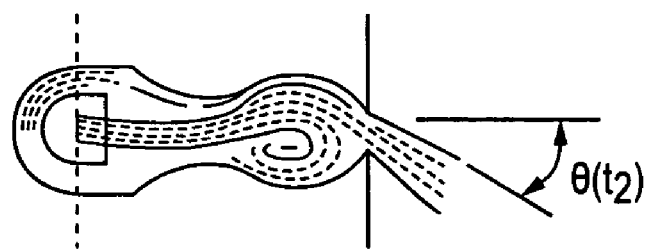
FIGS. 1A-1C illustrate the nature of the typical oscillations in the flow of a liquid exhausting from a fluidic oscillator into a gaseous environment and how the droplets of the flow from such an oscillator are swept over the fan angle of 2θ.
Figure 1B:
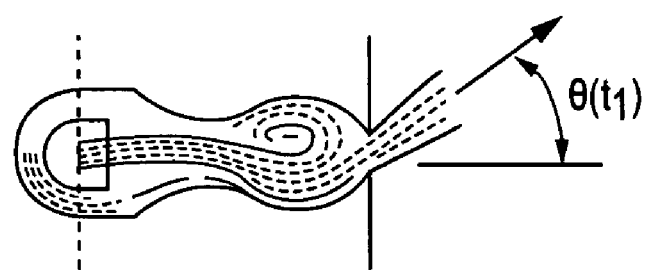
Figure 1C:
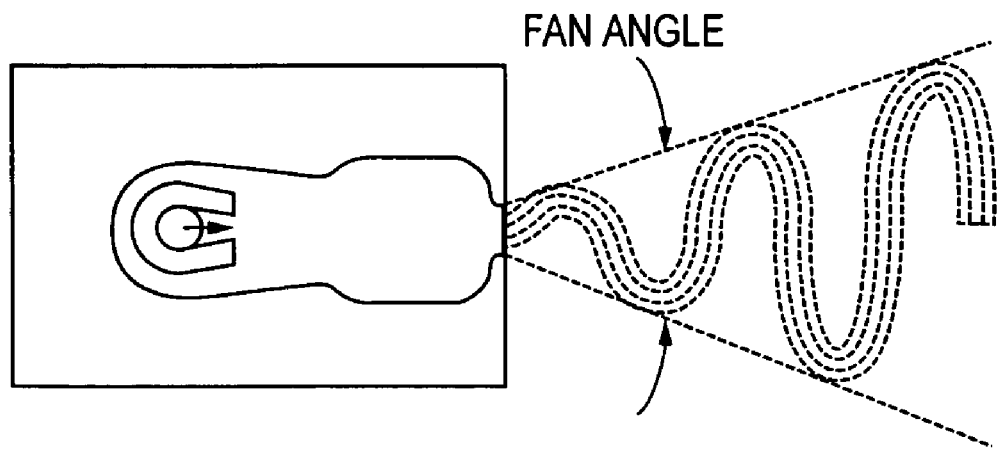

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways.

Also, it is to be understood that the phraseology and terminology employed herein are for the purpose of description and should not be regarded as limiting. For example, the discussion herein below generally relates to liquid spray techniques; however, it should be apparent that the inventive concepts described herein are applicable also to the dispersal of other fluids, including gases, fluidized solid particles, etc.

Figure 4:
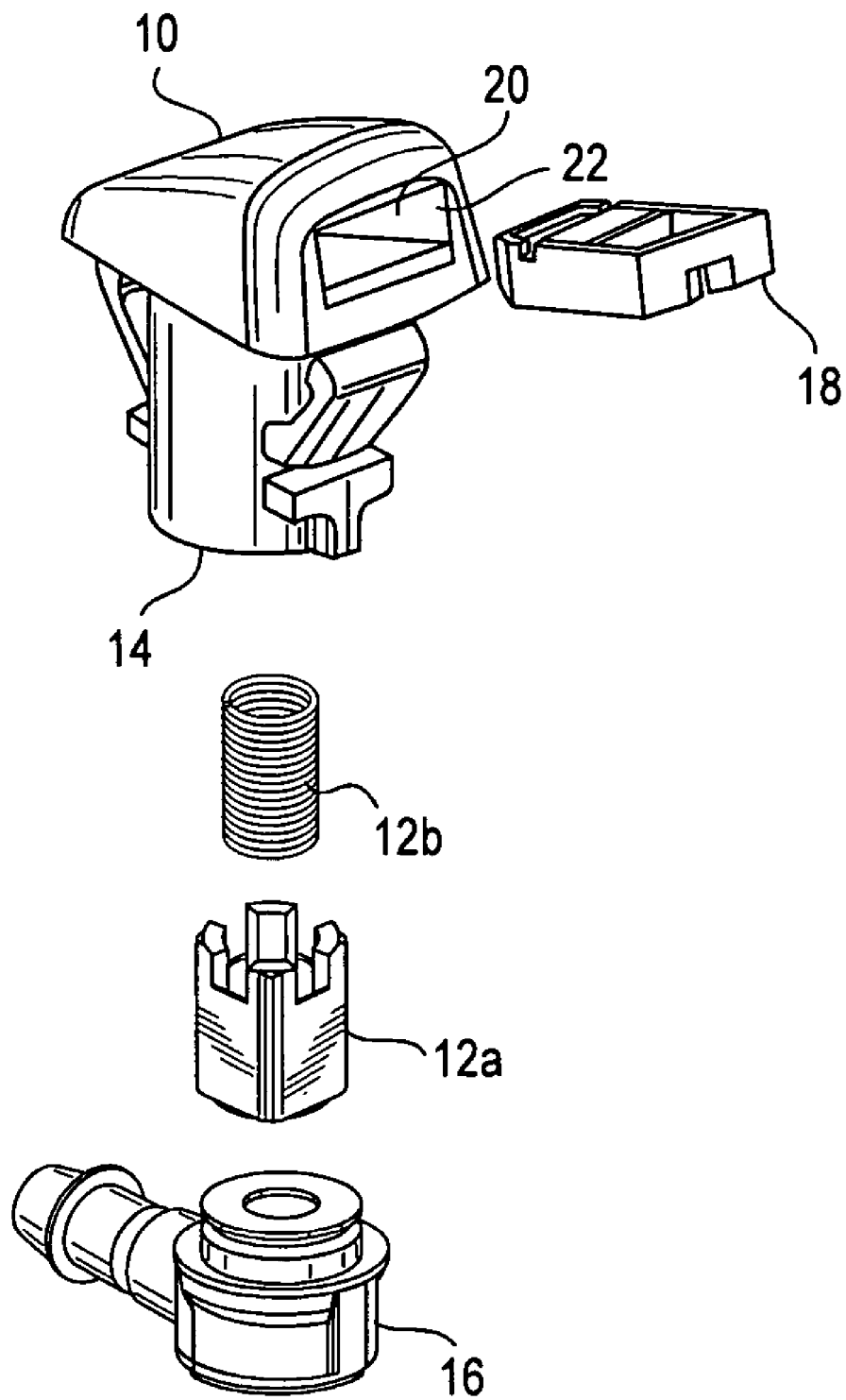
FIG. 4 shows an example of a typical fluidic spray device that is mounted in an automobile's hood to spray the front windshield.

The present invention involves methods for creating fluidic oscillators of the type that are suitable for generating oscillating, fluid jets having very distinctive and controllable flow patterns over a wide range of operating conditions, such as those that are encountered in various automotive windshield, headlamp and rear windshield cleaning applications. FIG. 4 shows an example of a typical fluidic spray device that is mounted in an automobile's hood to spray the front windshield. This fluidic spray device consists of: (a) an automotive housing 10, (b) a check valve 12, consisting of a piston 12a and a spring 12b, which connects at the check valve's downstream end to the inlet of the housing flow tube 14, and at its upstream end to an elbow 16 which directs fluid into the check valve, and (c) a fluid flow or fluidic insert 18 that is inserted into a cavity 20 that has been especially configured in the housing so as to receive the insert and form a fluid-tight seal between the cavity's sealing surfaces 22 and the insert's outer surfaces.

There are many different and well known designs of fluidic circuits or fluidic oscillators 2 that are suitable for use with these fluidic inserts. Many of these have some common features, including: at least one power nozzle (note: a "term of art" within fluidic oscillator technology that has been used almost from the beginning of their development; see U.S. Pat. No. 3,016,066 and explanation/definition beginning at col. 2, line 61 of the present Assignee's U.S. Pat. No. 4,052,002; see also FIGS. 2A-2C of U.S. Pat. No. 6,253,782 and FIGS. 6A-6B of U.S. Pat. No. 7,267,290, both of which are assigned to the present Assignee) 24 configured to accelerate the movement of the fluid that flows under pressure through the insert so that the flow from such a power nozzle takes the form of an essentially unsteady, free jet that separates from, and therefore is not permanently attached to either of, the downstream sidewalls that abut the power nozzle on either of its downstream edges, an interaction chamber 26 through which the fluid flows and in which the fluid flow phenomena is initiated that will eventually lead to the flow from the insert being of an oscillating nature, a fluid source inlet 28 (note: in a fluidic oscillator in which there is only one power nozzle, the source inlet usually also functions as the oscillator's power nozzle), a fluid outlet 30 from which the fluid exits the insert, and filter posts 32 that are located upstream of the power nozzle and serve to filter any larger diameter debris particles that are contained in the fluid flowing through the insert before these particles clog either the downstream power nozzles or the circuit's outlet.

Figure 2:
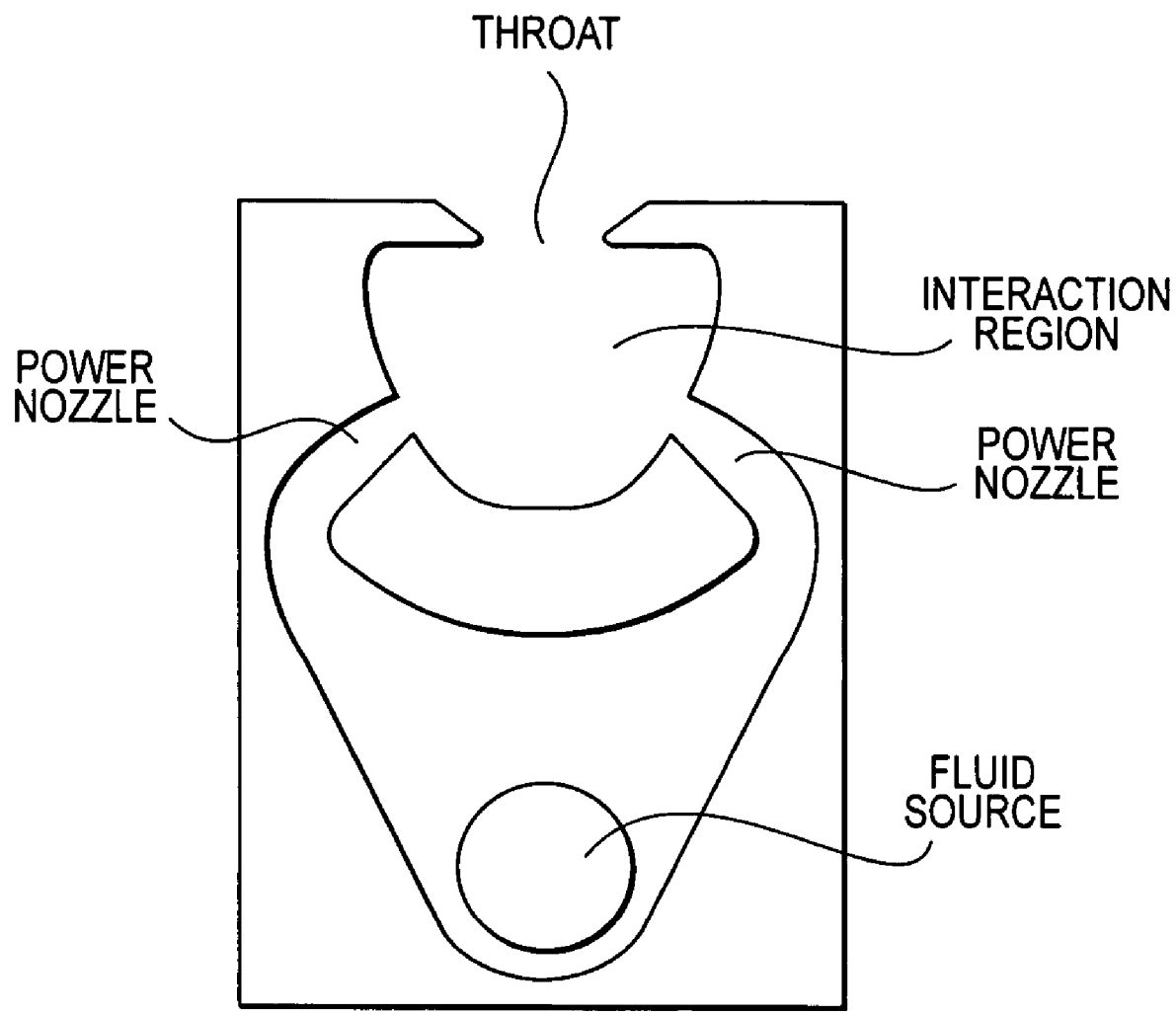
FIG. 2, as disclosed in U.S. Pat. No. 6,253,782, shows a prior art "mushroom oscillator" having an interaction region into which enters the jets from a pair of power nozzles; these jets interact to form interacting vortices which yield an oscillating flow from the fluidic's throat.
Figure 3:
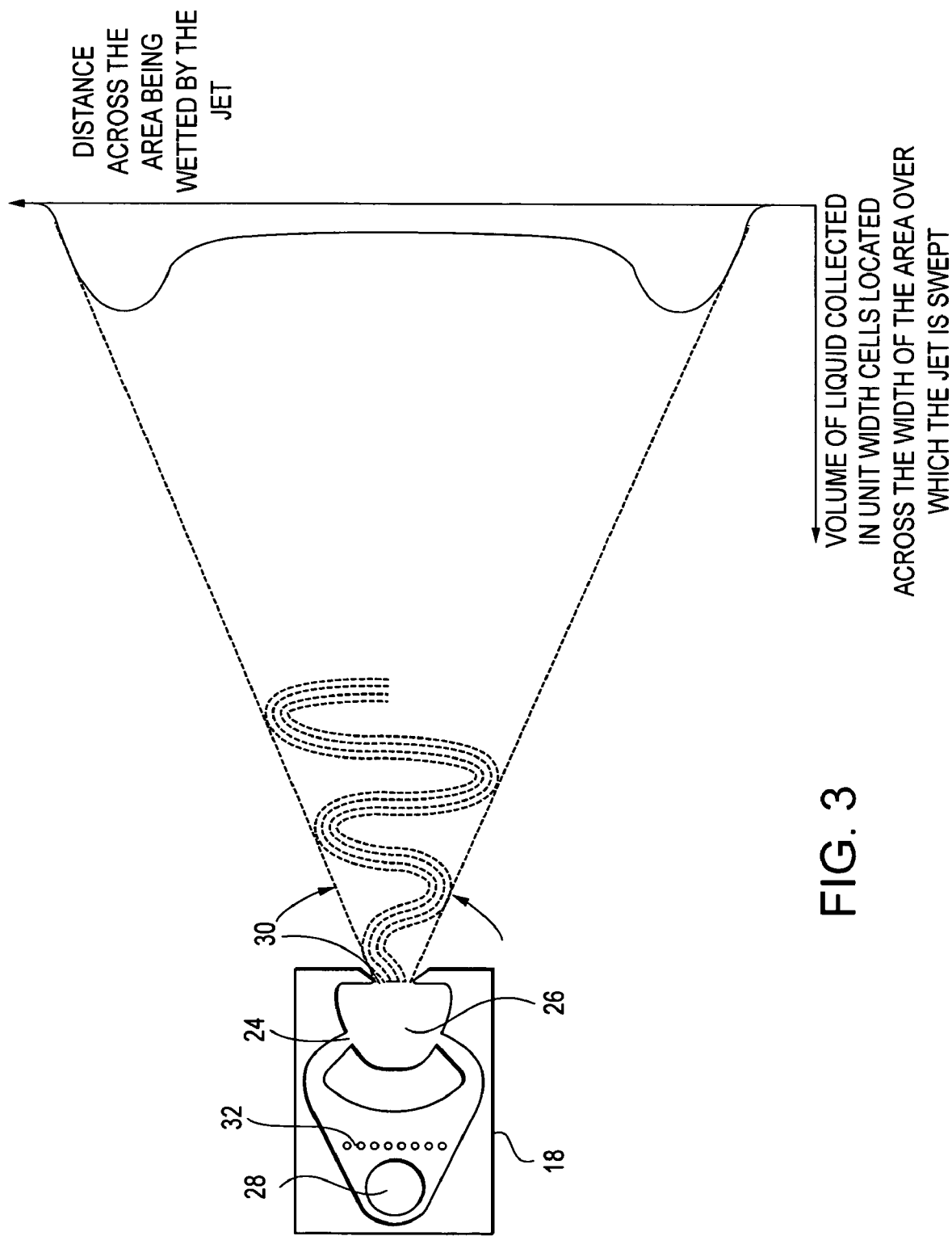
FIG. 3 illustrates the spray flow from a mushroom oscillator of FIG. 2 and how it results in a heavy ended distribution of liquid droplets on a plane perpendicular to the path of the spray; with such a distribution being characterized by a larger volume of the liquid being collected at the two ends of the distribution

As previously mentioned, it is desirable to have a fluidic oscillator that can operate with high viscosity liquids and give a more spatially uniform distribution of its spray droplets than that which is currently achieved with the "mushroom oscillator," see FIG. 2, the typical oscillator which is used in high viscosity, liquid applications. To satisfy this need, I invented the fluidic circuit shown in FIGS. 5-7 and which I refer to as a "three jet, island oscillator."

This new circuit is composed of three power nozzles 24, an interaction chamber 26 and an island 34 that sits in the interaction region 26 and is downstream of the center of the three power nozzles 24.

The interaction chamber 26 can be considered to have an upstream 26a and a downstream 26b portion, with the upstream portion having a pair of boundary edges 26c, 26d and a longitudinal centerline 26e equally spaced from these edges. See FIG. 5B.

In a preferred embodiment, one of each of the power nozzles is seen to be located at each of the edges 26c, 26d of the interaction chamber's upstream portion, and the third power nozzle is located on approximately the centerline 26e of the interaction chamber's upstream portion.

Additionally, the chamber's outlet or throat 30 from which a spray exhausts from the chamber's downstream portion 26b has right 30a and left 30b sidewalls that diverge downstream. The island 34 is located directly downstream of the power nozzle that is located on the centerline 26e of the interaction chamber.

By appropriately orienting and scaling these elements, one is able to generate flow vortices behind the island that are swept out of the throat in a manner such that the vortices are alternately proximate the throat's right sidewall and then its left sidewall.

A triangular shape has been selected as a first preferred embodiment for this island 34, although other shapes (e.g., circular) are possible. See FIG. 5B. This triangular island is oriented so that one of its points faces the oncoming flow from the center power nozzle.

Figure 5A:
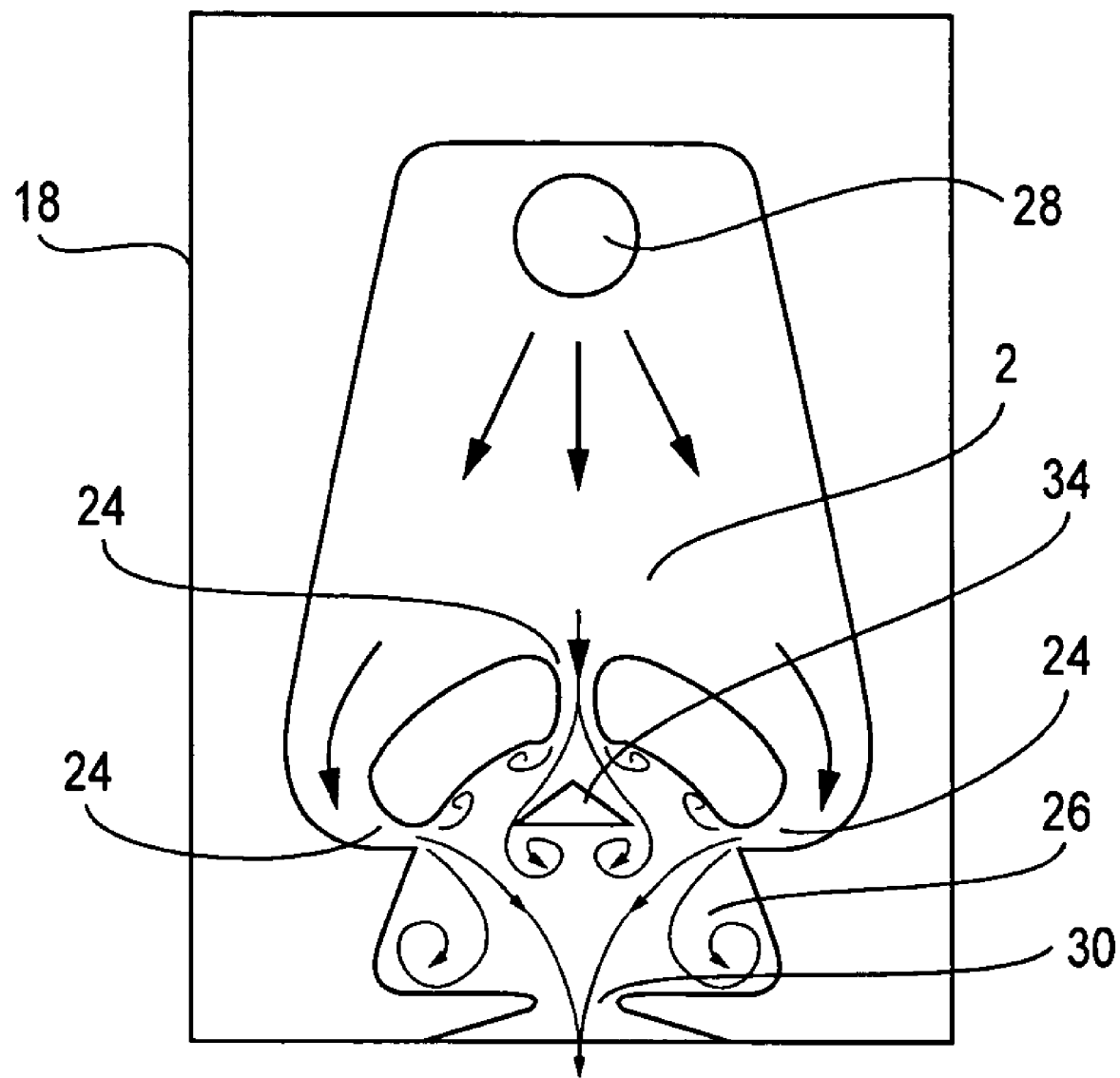
FIG. 5A shows a preferred embodiment of the new "three jet island" fluidic circuit of the present invention and the flow phenomena in and from this oscillator at an instant when the vortices formed at the island's trailing edges are equivalent in size.
Figure 6:
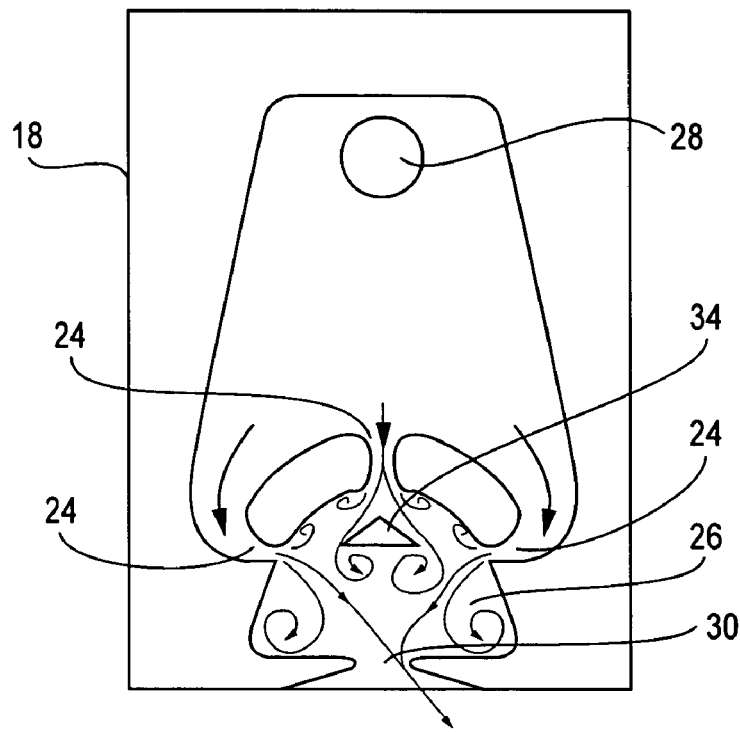
FIG. 6 shows a preferred embodiment of the new "three jet island" fluidic circuit of the present invention and the flow phenomena in and from this oscillator at an instant when the vortex behind the island's right trailing edge dominates.
Figure 7:
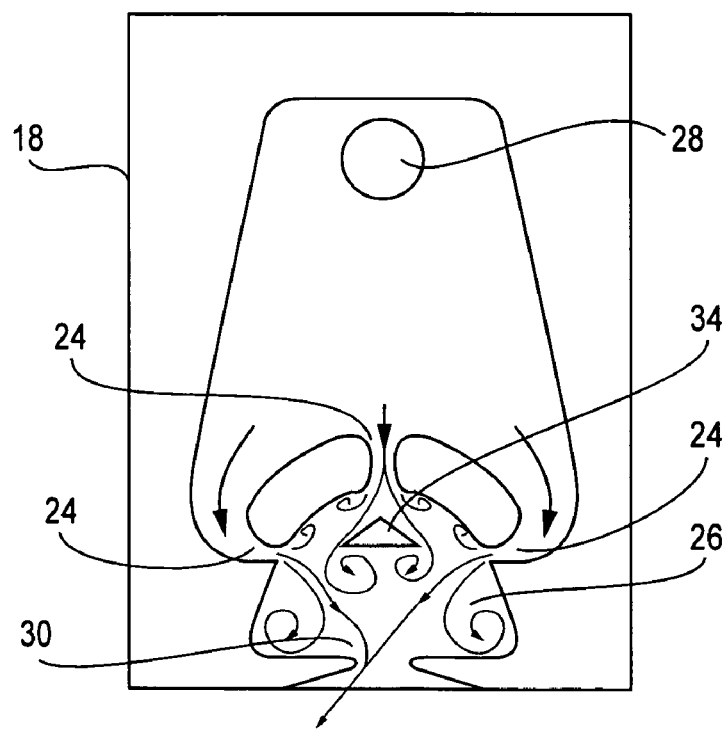
FIG. 7 shows a preferred embodiment of the new "three jet island" fluidic circuit of the present invention and the flow phenomena in and from this oscillator at an instant when the vortex behind the island's left trailing edge dominates.
Figure 8:
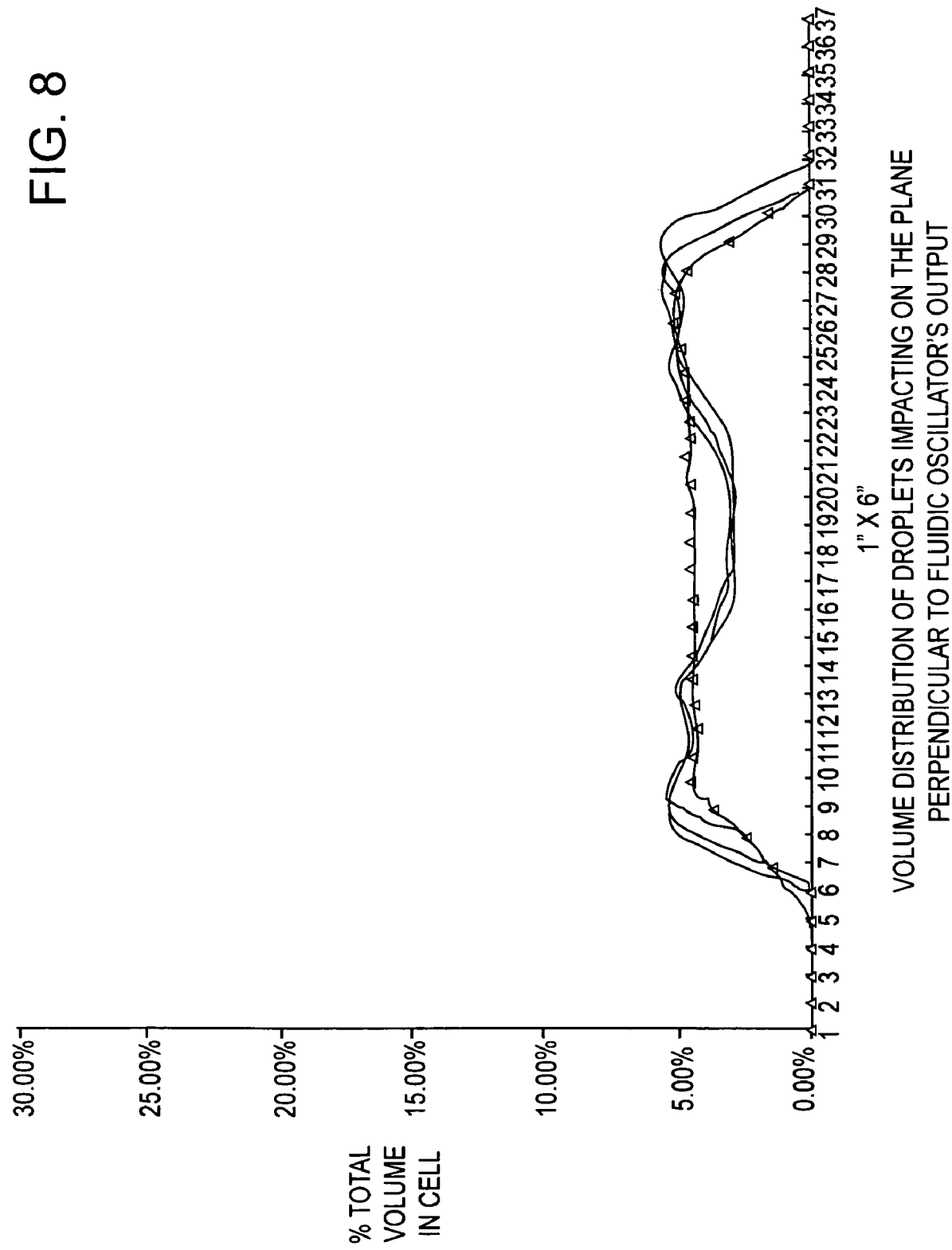
FIG. 8 illustrates for the fluidic circuit shown in FIGS. 5-7 the spatial distribution of liquid droplets that impact on a plane perpendicular to the path of the spray; with such a distribution being characterized as being uniform across the height of the spray.
Figure 9:
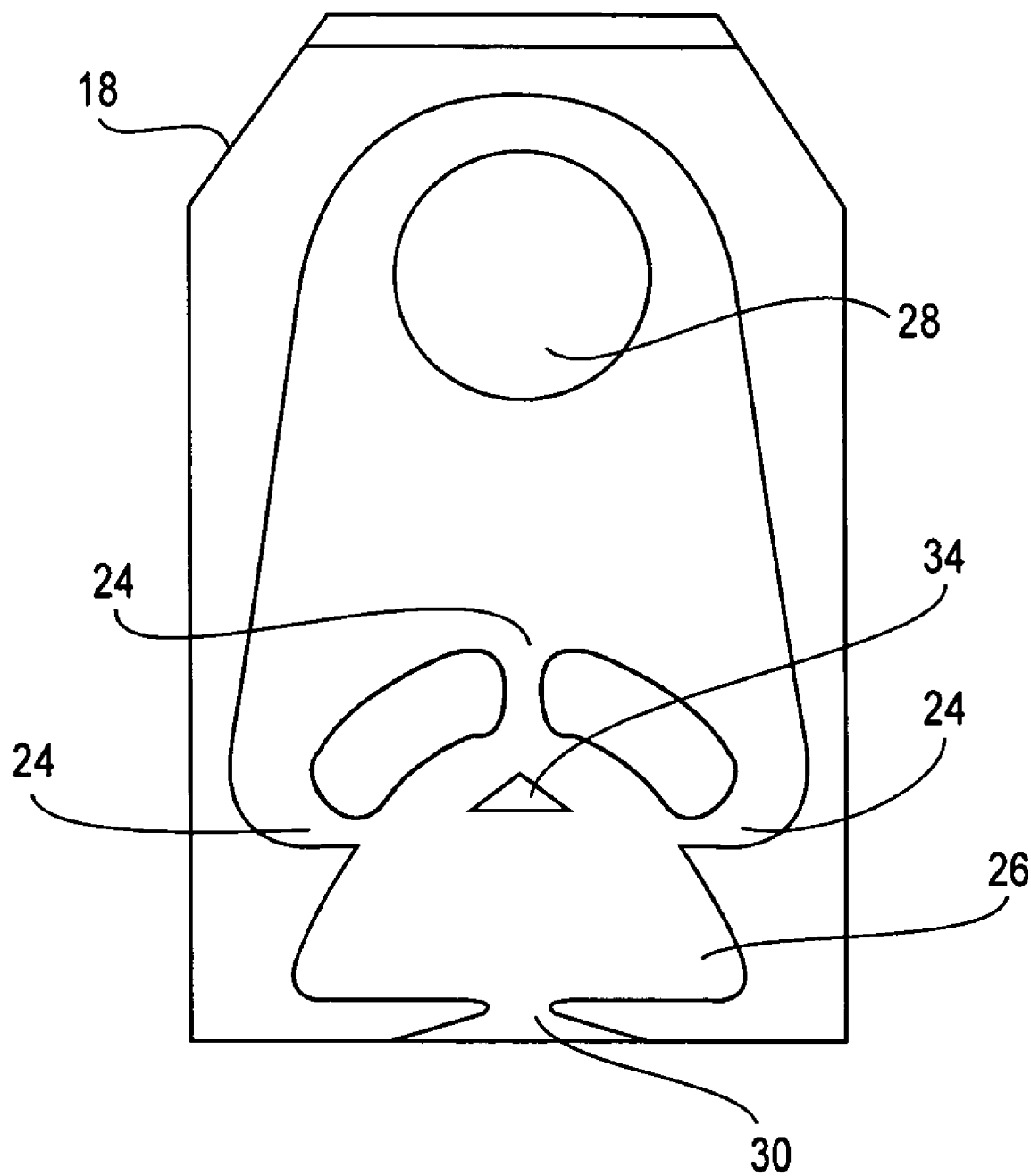
FIG. 9 shows another preferred embodiment of the new "three jet island" fluidic circuit of the present invention; with this embodiment having a more compact geometry than that of the oscillator shown in FIGS. 5-7.
Figure 10:
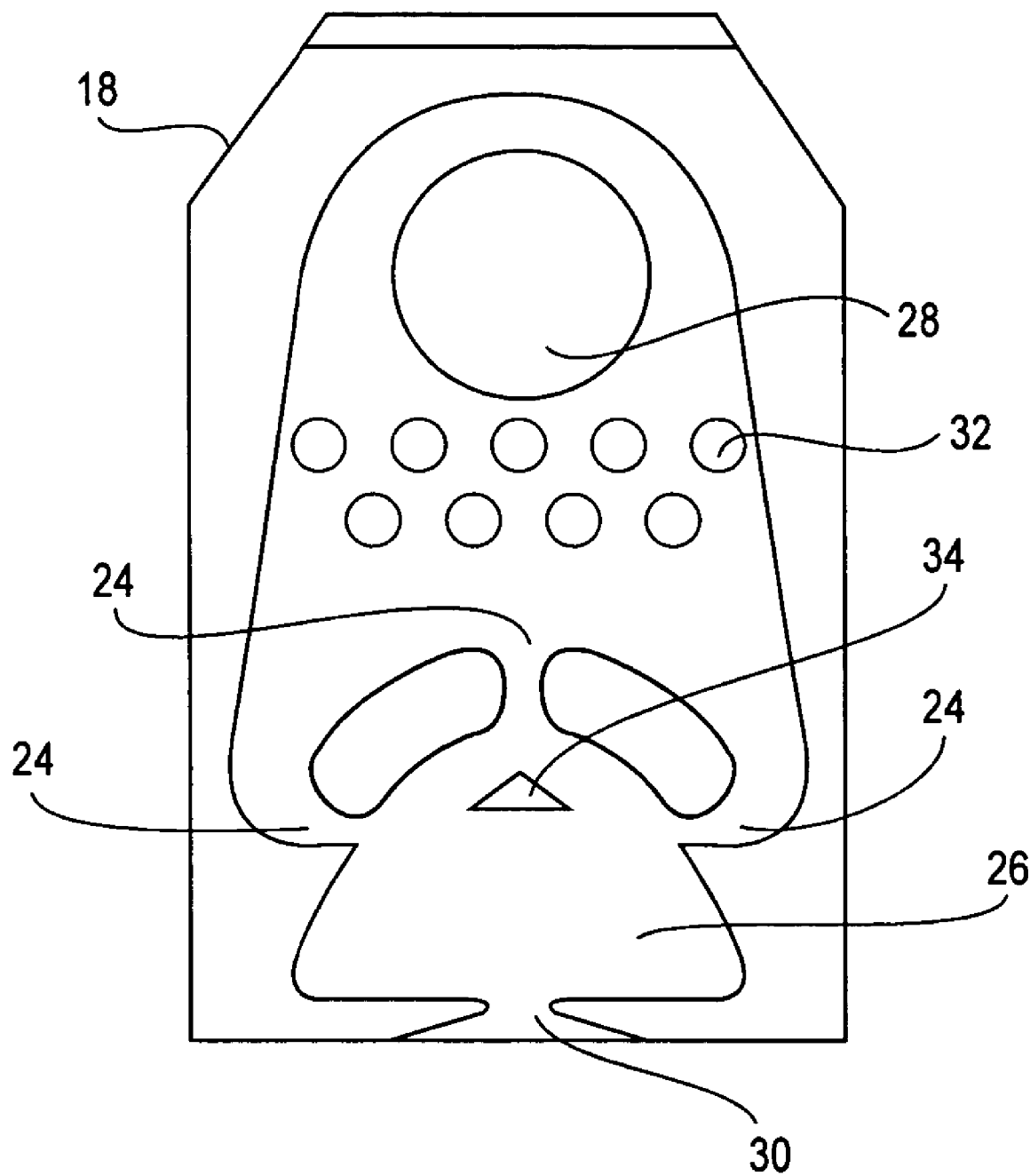
FIG. 10 shows another preferred embodiment of the new "three jet island" fluidic circuit of the present invention; with this embodiment having two rows of staggered filter posts.
Figure 11:
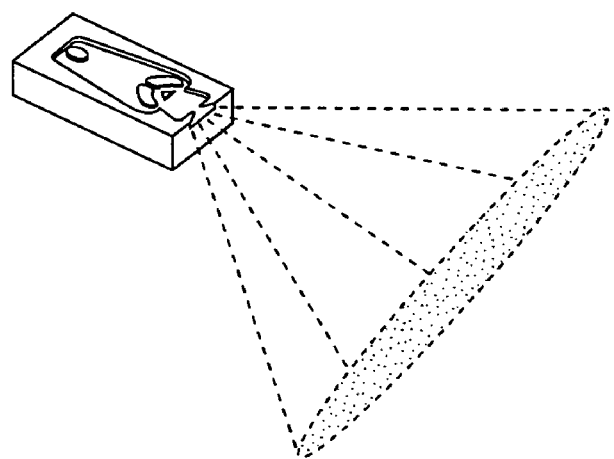
FIG. 11 illustrates the flat or two-dimensional fan spray that is characteristic of the new "three jet island" fluidic circuits of the present invention.

The flow patterns at successive instances in this oscillator are shown by the flow streamlines which are superimposed in FIGS. 5-7. Vortices are seen to be shed from the downstream edges of the triangular island 34. At an instance when these vortices are of approximately the same size, they act to equally block the flow coming from the outer power nozzles so that more liquid flows through the center power nozzle, around the island and exits the oscillator along the direction of the centerline of the oscillator's outlet or throat 30. See FIG. 5A.

Because of instabilities in this flow pattern, the vortices behind the island will not remain symmetric for long. Consequently, a flow pattern like that shown in either FIG. 6 or 7 may quickly develop in alternating instances.

In FIG. 6, the situation is shown in which the vortex behind the right, trailing edge of the island 34 has grown at a faster rate than that being shed from its left, trailing edge. As a result, the flow through the right power nozzle is more blocked than that through the left or center power nozzles. With the majority of the flow through the interaction region 26 being from the left side, the flow from the oscillator's outlet 30 is seen to be deflected to the right side of the outlet's centerline.

As the vortex which is growing behind the island's right, trailing edge gets larger, it will eventually be swept further downstream and all or part of it will flow through the oscillator's outlet. Shortly after this instance, the vortices behind the island's trailing edges will be more nearly the same size, but the vortex behind the island's left side will now be growing faster than the one behind the island's right side. A short time later, the flow through the oscillator will more closely resemble that shown in FIG. 7.

At this instant, the left vortex dominates and blocks the flow through the left power nozzle. Consequently, flow through the right side of the oscillator 18 dominates and deflects the outlet flow from the oscillator so that its direction of flow is to the left of the centerline of the oscillator's outlet 30. The combination of the flow phenomena seen is FIGS. 5-7 is the sweeping from one side to the other of the flow from the oscillator.

For flowrates and oscillator outlets sized appropriately for use in automotive windshield cleaning applications and using close to a water solution as the liquid flowing through such an oscillator, the Strouhal number, S, for these flows has been observed to be almost constant, where:

$$S=fd/v$$

with:
f=frequency of oscillator's sweeping action (cps)
d=width of the oscillator's island (cm)
v=velocity through the oscillator's center power nozzle (cm/sec)
S=Strouhal number.

Figure 12A:
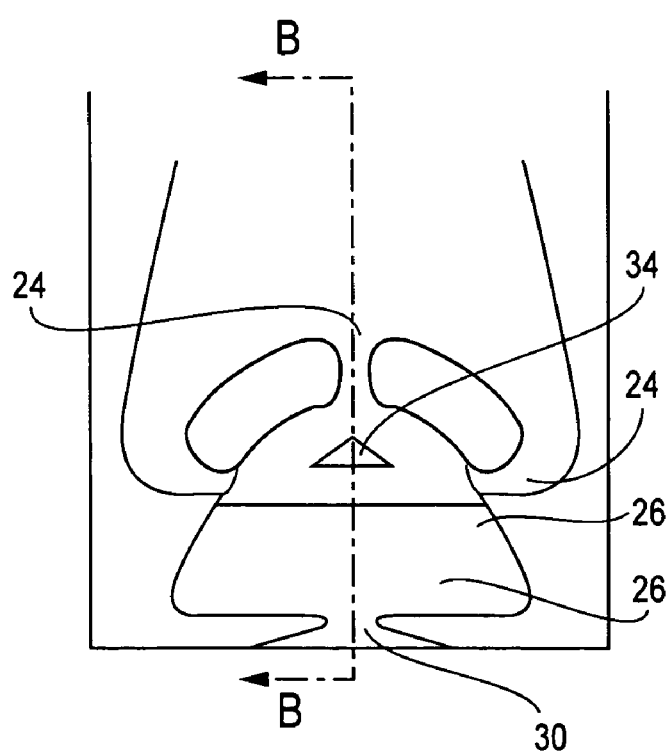
FIGS. 12A-12B illustrate the top and centerline, side views of the downstream end of a three-jet island oscillator whose interaction chamber has a downward sloped or tapered floor.
Figure 12B:
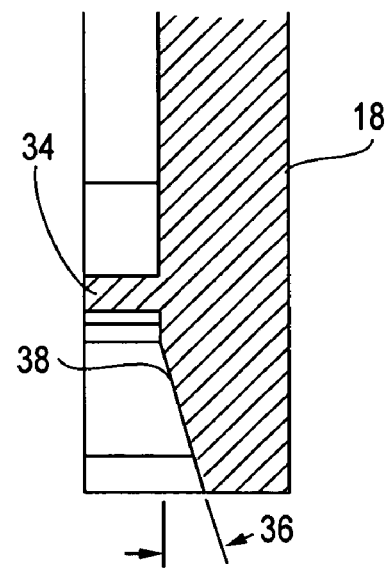

Additionally, it has been found that placing the oscillator island 34 directly downsream of the oscillator's center power nozzle yields a uniform distribution of droplets in the spray flowing from the oscillator at fan angles in the range of 20 to 130 degrees. See FIG. 8. For such a uniform spatial distribution, the downstream location of the oscillator island 34 must not be too close to the center power nozzle or so far from it that the island would tend to split the flow from the power nozzles at the edges of the interaction chamber 26. For power nozzles of width 0.37 mm, a distance of 1.75 mm between the nozzle exit and the lead point on the island has been found to be sufficient to yield a relatively uniform droplet distribution.

Shown in FIG. 9 is another preferred embodiment for the present invention. In this embodiment, the geometry of the oscillator is more compact (i.e., its interaction region 26 is closer to its fluid source inlet 28) and the passageways leading to the two outside power nozzles are smaller in size and thus more restrictive than those for the embodiment of the oscillator shown in FIGS. 5-7. For example, with the center power nozzle having a width of 0.48 mm, the outside power nozzles have a width of 0.37 mm.

Shown in FIG. 10 is another preferred embodiment for the present invention. In this embodiment, the general geometry of the oscillator 18 is similar to that shown in FIG. 9 and to this embodiment has been added two rows of staggered filter posts 36 which are situated just downstream of the fluid source inlet 28. This staggered arrangement of filter posts has proven to be an improvement over the single row of filter posts that are typically used in fluidic oscillators. The minimum dimension here is the diagonal distance between the posts. The clogging of a path between these posts will not have as negative an effect as would the clogging of a path in the single row of filter posts.

As a result of the more uniform, spatial distribution of liquid droplets from fluidic oscillators of the type disclosed herein, the sprays from these oscillators are often referred to as uniform flat or uniform two-dimensional fan sprays. Such a spray is illustrated in FIG. 11.

In some instances, it is desirable to increase the thickness of such sprays. It has been found that this can be accomplished by providing a downward taper 36 or slope to the floor 38 of the interaction region 26 of such oscillators. See FIGS. 12A-12B which show the top view and a centerline, side view of the downstream end of a three-jet island oscillator that has a downward sloped floor.

Downward tapers 36 or slopes in the range of 10 to 20 degrees have been found to yield relative thick sprays, i.e., the top and bottom edges of such sprays are seen to diverge so as to have included angles in the range of 5 to 15 degrees.

In those instances when such oscillators are used in colder environments, it has been found helpful for maintaining their operating characteristics to provide them with higher input pressures (i.e., above their standard input pressures of 5-15 psi) so as to compensate for the resulting higher viscosities (i.e., approximately 20 centipoise and higher) of the liquids passing through them at lower temperatures. When it is not possible or convenient to impose such higher input pressures, it has been found that certain design modifications also help to preserve the operating characteristics of these circuits.

Figure 13:
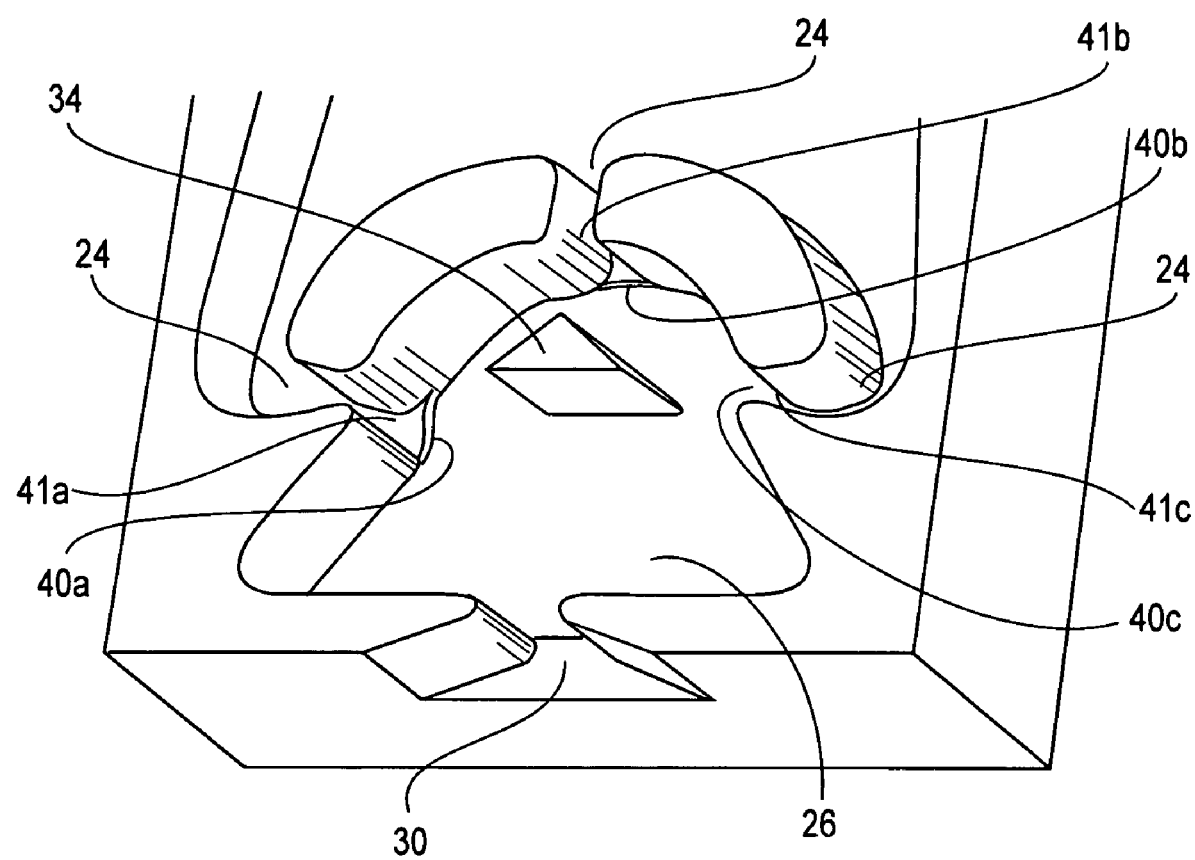
FIG. 13 illustrates a top-side perspective view of the downstream end of a three-jet island oscillator which has a downward step at each of the points where the power nozzles exit into the interaction chamber.

One such design modification is the introduction of a step 40a, 40b, 40c beneath each of the power nozzles at the point where their exits 41a, 41b, 41c intersect with the interaction chamber 26. See FIG. 13.

The effect of such steps is to cause a small flow separation region under the flow that jets from the power nozzles into the interaction chamber. The mixing of the relatively higher velocity jets exiting the power nozzles with that of the slower moving fluid that it entrains from below creates the desired instabilities in the jet's flow characteristics. This action is seen to promote the continued oscillatory nature of the flow from such an insert as the temperature of the fluid flowing through it is decreased.

It has been observed that the larger the relative height of the step to that of the power nozzle, the more the oscillating nature of the insert's spray can be preserved as the temperature of the fluid flowing through the insert is decreased. However, it also has been observed that the fan angles of such sprays tend to decrease slightly with such temperature decreases. Hence, it has proven best to identify at a desired colder operating temperature a specific ratio of the step height to the nozzle height so as to yield a sufficiently robust oscillating flow in which there is minimal decrease if in the fan angle of the resulting spray.

For power nozzles of height 0.85-0.92 mm in a fluidic insert that is operating at a pressure of 5-15 psi, a step height of in the range of 0.08-0.16 mm has been experimentally found to yield adequate flow instabilities in the interaction chamber so as to yield, at lower temperatures, a robust oscillating flow with minimal fan angle decreases from such an insert. Step height to power nozzle height ratios in the range of 0.10-0.20 have been found to significantly improve the cold performance of such oscillators. Optimal performance was achieved with ratios of 0.12-0.15.

Although the foregoing disclosure relates to preferred embodiments of the invention, it is understood that these details have been given for the purposes of clarification only. Various changes and modifications of the invention will be apparent, to one having ordinary skill in the art, without departing from the spirit and scope of the invention as hereinafter set forth in the claims.

I claim:

1. A fluidic oscillator that operates on pressurized fluid flowing through said oscillator to generate an exhaust flow in the form of a spray of fluid droplets, said oscillator comprising:

an inlet for said pressurized fluid, a set of three power nozzles that are fed by said pressurized fluid from said inlet, wherein each of said power nozzles configured to accelerate the movement of said pressurized fluid that flows through said power nozzles so as to form a herein defined free jet of fluid that flows from each said power nozzle, an interaction chamber attached to said nozzles and which receives said flow from said nozzles, wherein said chamber having an upstream and a downstream portion, said upstream portion having a pair of boundary edges and a longitudinal centerline that is approximately equally spaced between said edges, wherein one of said power nozzles being located proximate said longitudinal centerline of said interaction chamber, a throat from which said spray exhausts from said interaction chamber, and an island located in said interaction chamber, wherein said island being situated downstream of said power nozzle that is located proximate said longitudinal centerline of said interaction chamber.

2. The fluidic oscillator as recited in claim 1, wherein:

one of said power nozzles being located proximate each of said interaction chamber, upstream portion boundary edges, said nozzles configured to accelerate the movement of said pressurized fluid that flows through said nozzles, and said throat having right and left sidewalls that diverge downstream.

3. The fluidic oscillator as recited in claim 2, wherein said power nozzles and said island being oriented and scaled such as to generate flow vortices behind said island that are swept out of said throat in a manner such that said vortices flow alternately proximate said right sidewall and then said left sidewall of said throat.

4. The fluidic oscillator as recited in claim 1, wherein:

said island being configured to have a triangular shape with three intersection points defined by the sides of said island, and said island being oriented such that one of said points faces said flow from said power nozzle that is located proximate said longitudinal centerline of said interaction chamber.

5. The fluidic oscillator as recited in claim 3, wherein:

said island being configured to have a triangular shape with three intersection points defined by the sides of said island, and said island being oriented such that one of said points faces said flow from said power nozzle that is located proximate said longitudinal centerline of said interaction chamber.

6. The fluidic oscillator as recited in claim 1, further comprising filter posts situated between said fluid inlet and said power nozzles.

7. The fluidic oscillator as recited in claim 5, further comprising filter posts situated between said fluid inlet and said power nozzles.

8. The fluidic oscillator as recited in claim 1, wherein: said interaction chamber having a floor, and said floor being sloped downward in the direction from said upstream to said downstream portion of said chamber.

9. The fluidic oscillator as recited in claim 5, wherein: said interaction chamber having a floor, and said floor being sloped downward in the direction from said upstream to said downstream portion of said chamber.

10. The fluidic oscillator as recited in claim 8, wherein the amount of said floor slope being in the range of 10 to 20 degrees.

11. The fluidic oscillator as recited in claim 9, wherein the amount of said floor slope being in the range of 10 to 20 degrees.

12. The fluidic oscillator as recited in claim 1, further comprising a step in the height elevation of the floor of said power nozzles with respect to that of said floor of said interaction chamber.

13. The fluidic oscillator as recited in claim 12, wherein the ratio of the height of said step to the height of said power nozzle is in the range of 0.10 to 0.20.

14. The fluidic oscillator as recited in claim 5, further comprising a step in the height elevation of the floor of said power nozzles with respect to that of said floor of said interaction chamber.

15. The fluidic oscillator as recited in claim 14, wherein the ratio of the height of said step to the height of said power nozzle is in the range of 0.10 to 0.20.

16. A method of forming a spray of fluid droplets, said method comprising the steps of:
    causing a pressurized fluid to flow into an inlet,
    placing a set of three power nozzles downstream from said inlet, wherein each of said power nozzles configured to accelerate the movement of said pressurized fluid that flows through said power nozzles so as to form a herein defined free jet of fluid that flows from each said power nozzle,
    attaching an interaction chamber downstream from said nozzles and configuring said chamber to receive said flow from said nozzles,
    wherein said chamber having an upstream and a downstream portion, said upstream portion having a pair of boundary edges and a longitudinal centerline that is approximately equally spaced between said edges,
    wherein one of said power nozzles being located proximate said longitudinal centerline of said interaction chamber,
    providing said chamber with a throat from which said spray exhausts from said interaction chamber, and
    locating an island in said interaction chamber,
    wherein said island being situated downstream of said power nozzle that is located proximate said longitudinal centerline of said interaction chamber.

17. The method as recited in claim 16, wherein:
    one of said power nozzles being located proximate each of said interaction chamber, upstream portion boundary edges,
    said nozzles configured to accelerate the movement of said pressurized fluid that flows through said nozzles, and said throat having right and left sidewalls that diverge downstream.

18. The method as recited in claim 17, wherein said power nozzles and said island being oriented and scaled such as to generate flow vortices behind said island that are swept out of said throat in a manner such that said vortices flow alternately proximate said right sidewall and then said left sidewall of said throat.

19. The method as recited in claim 16, wherein:
    said island being configured to have a triangular shape with three intersection points defined by the sides of said island, and
    said island being oriented such that one of said points faces said flow from said power nozzle that is located proximate said longitudinal centerline of said interaction chamber.

20. The method as recited in claim 18, wherein:
    said island being configured to have a triangular shape with three intersection points defined by the sides of said island, and
    said island being oriented such that one of said points faces said flow from said power nozzle that is located proximate said longitudinal centerline of said interaction chamber.

21. The method as recited in claim 16, further comprising the step of situating filter posts between said fluid inlet and said power nozzles.

22. The method as recited in claim 20, further comprising the step of situating filter posts between said fluid inlet and said power nozzles.

23. The method as recited in claim 16, wherein: said interaction chamber having a floor, and said floor being sloped downward in the direction from said upstream to said downstream portion of said chamber.

24. The method as recited in claim 20, wherein: said interaction chamber having a floor, and said floor being sloped downward in the direction from said upstream to said downstream portion of said chamber.

25. The method as recited in claim 23, wherein the amount of said floor slope being in the range of 10 to 20 degrees.

26. The method as recited in claim 24, wherein the amount of said floor slope being in the range of 10 to 20 degrees.

27. The method as recited in claim 16, further comprising the step of providing a step in the height elevation of the floor of said power nozzles with respect to that of said floor of said interaction chamber.

28. The method as recited in claim 27, wherein the ratio of the height of said step to the height of said power nozzle is in the range of 0.10 to 0.20.

29. The method as recited in claim 20, further comprising the step of providing a step in the height elevation of the floor of said power nozzles with respect to that of said floor of said interaction chamber.

30. The method as recited in claim 29, wherein the ratio of the height of said step to the height of said power nozzle is in the range of 0.10 to 0.20.

31. An automotive windshield washing apparatus comprising:
    a fluidic insert that operates on pressurized fluid flowing through said insert to generate an exhaust flow in the form of a spray of fluid droplets,
    said insert having a fluidic circuit molded into said insert, said fluidic circuit having:
        an inlet for said pressurized fluid,
        a set of three power nozzles that are fed by said pressurized fluid from said inlet, wherein each of said power nozzles configured to accelerate the movement of said pressurized fluid that flows through said power nozzles so as to form a herein defined free jet of fluid that flows from each said power nozzle,
        an interaction chamber attached to said nozzles and which receives said flow from said nozzles,
        wherein said chamber having an upstream and a downstream portion, said upstream portion having a pair of boundary edges and a longitudinal centerline that is approximately equally spaced between said edges,
        wherein one of said power nozzles being located proximate said longitudinal centerline of said interaction chamber,
        a throat from which said spray exhausts from said interaction chamber, and
        an island located in said interaction chamber,
        wherein said island being situated downstream of said power nozzle that is located proximate said longitudinal centerline of said interaction chamber.

32. The automotive windshield washing apparatus as recited in claim 31, wherein: one of said power nozzles being located proximate each of said interaction chamber, upstream portion boundary edges, said nozzles configured to accelerate the movement of said pressurized fluid that flows through said nozzles, and said throat having right and left sidewalls that diverge downstream.

33. The automotive windshield washing apparatus as recited in claim 32, wherein said power nozzles and said island being oriented and scaled such as to generate flow vortices behind said island that are swept out of said throat in a manner such that said vortices flow alternately proximate said right sidewall and then said left sidewall of said throat.

34. The automotive windshield washing apparatus as recited in claim 31, wherein:
said island being configured to have a triangular shape with three intersection points defined by the sides of said island, and
said island being oriented such that one of said points faces said flow from said power nozzle that is located proximate said longitudinal centerline of said interaction chamber.

35. The automotive windshield washing apparatus as recited in claim 33, wherein:
said island being configured to have a triangular shape with three intersection points defined by the sides of said island, and
said island being oriented such that one of said points faces said flow from said power nozzle that is located proximate said longitudinal centerline of said interaction chamber.

36. The automotive windshield washing apparatus as recited in claim 31, further comprising filter posts situated between said fluid inlet and said power nozzles.

37. The automotive windshield washing apparatus as recited in claim 35, further comprising filter posts situated between said fluid inlet and said power nozzles.

38. The automotive windshield washing apparatus as recited in claim 31, wherein: said interaction chamber having a floor, and said floor being sloped downward in the direction from said upstream to said downstream portion of said chamber.

39. The automotive windshield washing apparatus as recited in claim 35, wherein: said interaction chamber having a floor, and said floor being sloped downward in the direction from said upstream to said downstream portion of said chamber.

40. The automotive windshield washing apparatus as recited in claim 38, wherein the amount of said floor slope being in the range of 10 to 20 degrees.

41. The automotive windshield washing apparatus as recited in claim 39, wherein the amount of said floor slope being in the range of 10 to 20 degrees.

42. The automotive windshield washing apparatus as recited in claim 31, further comprising a step in the height elevation of the floor of said power nozzles with respect to that of said floor of said interaction chamber.

43. The automotive windshield washing apparatus as recited in claim 42, wherein the ratio of the height of said step to the height of said power nozzle is in the range of 0.10 to 0.20.

44. The automotive windshield washing apparatus as recited in claim 35, further comprising a step in the height elevation of the floor of said power nozzles with respect to that of said floor of said interaction chamber.

45. The automotive windshield washing apparatus as recited in claim 44, wherein the ratio of the height of said step to the height of said power nozzle is in the range of 0.10 to 0.20.

* * * * *